United States Patent
Benter et al.

(10) Patent No.: US 8,944,651 B2
(45) Date of Patent: Feb. 3, 2015

(54) VEHICLE LIGHT

(75) Inventors: Nils Benter, Düsseldorf (DE); Benno Spinger, Aachen (DE); Ludo Haenen, Sint Oedenrode (NL); Augustinus Gregorius Henricus Meijers, Breda (NL); Wouter Petrus Kaandorp, Best (NL)

(73) Assignee: Koninklijke Philips N.V., Eindhoven (NL)

( * ) Notice: Subject to any disclaimer, the term of this patent is extended or adjusted under 35 U.S.C. 154(b) by 869 days.

(21) Appl. No.: 12/600,495

(22) PCT Filed: May 15, 2008

(86) PCT No.: PCT/IB2008/051914
§ 371 (c)(1),
(2), (4) Date: May 4, 2010

(87) PCT Pub. No.: WO2008/142618
PCT Pub. Date: Nov. 27, 2008

(65) Prior Publication Data
US 2010/0315827 A1   Dec. 16, 2010

(30) Foreign Application Priority Data
May 23, 2007   (EP) .................................... 07108707

(51) Int. Cl.
*B60Q 1/26*   (2006.01)
*F21S 8/10*   (2006.01)
(Continued)

(52) U.S. Cl.
CPC .............. *B60Q 1/2696* (2013.01); *F21S 48/215* (2013.01); *F21Y 2101/02* (2013.01); *F21S 48/2243* (2013.01); *F21S 48/24* (2013.01); *F21S 48/2268* (2013.01)
USPC ......................................... 362/516; 362/520

(58) Field of Classification Search
CPC ..... B60Q 1/0011; B60Q 1/2696; F21S 48/215; F21S 48/24; F21S 48/2243
USPC ......... 362/299, 307–310, 327–329, 506, 507, 362/511, 516–522
See application file for complete search history.

(56) References Cited

U.S. PATENT DOCUMENTS

| 6,097,549 A | 8/2000 | Jenkins et al. |
| 6,409,369 B1 | 6/2002 | De Lamberterie |

(Continued)

FOREIGN PATENT DOCUMENTS

| DE | 200200571 U1 | 5/2002 |
| DE | 10336162 A1 | 2/2005 |

(Continued)

OTHER PUBLICATIONS

Dietz et al: "Very Low-Cost Sensing and Communication Using Bidirectional LEDs"; TR2003-35, Jul. 2003, Mitsubishi Electric Research Laboratories, 19 Page Document.

(Continued)

*Primary Examiner* — Nimeshkumar Patel
*Assistant Examiner* — Steven Horikoshi

(57) ABSTRACT

The invention relates to a motor vehicle lighting fixture which comprises at least: a light source comprising at least one LED; a light-transmitting part that is arranged such that it receives light from the light source; and a reflector that is arranged such that it reflects that portion of the light from the light source that passes through the light-transmitting part and couples it out to the front of the lighting fixture, a reflection portion and a refraction portion being provided within the light-transmitting part, wherein said reflection portion deflects the light issuing from the light source through total reflection in one direction that is substantially perpendicular to the optical axis of the reflector, whereas the refraction portion couples out the light in the direction of the reflector.

7 Claims, 2 Drawing Sheets

Figure 1:
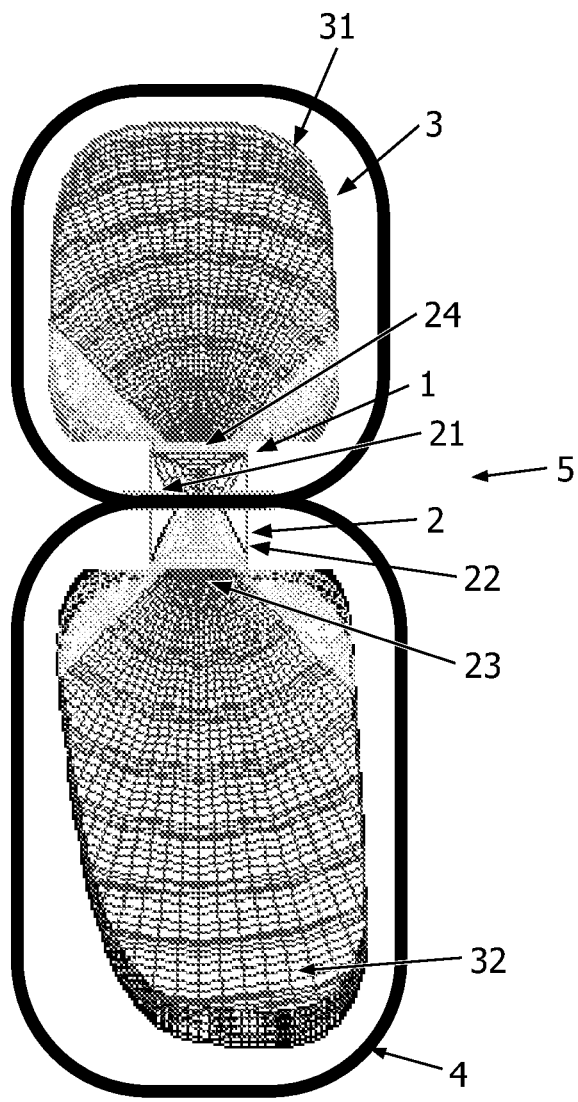

(51) Int. Cl.
*B60Q 1/34* (2006.01)
*B60Q 1/44* (2006.01)
*F21Y 101/02* (2006.01)

(56) References Cited

U.S. PATENT DOCUMENTS

| | | |
|---|---|---|
| 6,474,852 B1 | 11/2002 | Ohkohdo |
| 6,598,998 B2 | 7/2003 | West et al. |
| 6,617,560 B2 | 9/2003 | Forke |
| 2004/0027833 A1* | 2/2004 | Amano et al. ............... 362/507 |
| 2005/0063169 A1* | 3/2005 | Erber .............................. 362/31 |
| 2006/0227568 A1* | 10/2006 | Enders et al. ................ 362/514 |
| 2008/0002418 A1* | 1/2008 | Erdl .............................. 362/511 |

FOREIGN PATENT DOCUMENTS

| | | |
|---|---|---|
| DE | 102004020154 A1 | 11/2005 |
| JP | 2005327649 A | 11/2005 |
| WO | 03074931 A1 | 9/2003 |

OTHER PUBLICATIONS

"An Unusual Design Which Uses an LED Both as the Light Sensor and Indicator"; EPE Magazine, Jan. 2005, Downloaded at http://www.epemag.com/projects.html, on October 10, 2006, I Page Document.

"Luxeon III 190 Lumen Performance Enables Single-LED Rear Combination Lamps"; Lumileds Press Release, Downlated at http://www.lumileds.com/newsand events/releases/PR36.pdf on Oct. 25, 2006.

* cited by examiner

VEHICLE LIGHT

The invention relates to a motor vehicle lighting fixture which comprises at least: a light source comprising at least one LED; a light-transmitting part that is arranged such that it receives light from the light source; and a reflector that is arranged such that it reflects that portion of the light from the light source that passes through the light-transmitting part and couples it out to the front of the lighting fixture, a reflection portion and a refraction portion being provided within the light-transmitting part, wherein said reflection portion deflects the light issuing from the light source through total reflection in one direction that is substantially perpendicular to the optical axis of the reflector, whereas the refraction portion couples out the light in the direction of the reflector.

Such motor vehicle lighting fixtures may have at least two functions, a first function being characterized by the light that leaves the reflector and a second function being characterized by the light not incident on the reflector (not new).

Such a light-transmitting part arranged so as to receive light from a light source, in particular from an LED unit, and to radiate it substantially perpendicularly to the optical axis of the light source is known from U.S. Pat. No. 6,598,998 B2.

Said light-transmitting part has a reflection portion and a refraction portion which are arranged in particular on the surface of the light-transmitting part. The reflection portion deflects the light coming from the light source into one direction through total reflection.

The material chosen for the light-transmitting part is not subject to any special limitations, as long as this part is light-transmitting in a usual sense and has a sufficiently large difference in refractive index with air in order to provide total reflection. Examples of such materials are: PMMA and PC.

Motor vehicle lighting fixtures may comprise a rotationally symmetrical reflector and a similarly shaped light-transmitting part in which light from an LED light source is coupled in along the optical axis of the light source. The light leaves this light-transmitting part primarily in the direction of the reflector approximately perpendicularly to the optical axis.

In some embodiments, light is also secondarily radiated directly from the central region of the rotationally symmetrical light-transmitting part, in particular along or close to the optical axis.

It should be possible to observe the total reflecting surface area at the reflector in an extremely bright manner The reflector radiates the light incident thereon such that the legally required light distribution is obtained.

The LED light source may be arranged such that it is directed to the front of the lighting fixture. Alternatively, however, a different radiation characteristic of the LED light source may be encountered.

Reflectors suitable in principle for these applications are known, for example, from U.S. Pat. No. 6,097,549 A1.

The arrangement of reflection and refraction portions has for its object to achieve that the light will be coupled out to the reflector in a direction approximately perpendicular to the optical axis. The reflector is constructed in a conventional manner such that it reflects the light coming from the light-transmitting part to the front of the lighting fixture. Rotationally symmetrical reflectors have been described wherein the optical axis always passes through the center of the respective reflector.

The rotationally symmetrical construction of the reflector thus leads to a limitation of the degree of freedom for the design of the overall lighting fixture. There has not been offered any possibility either for rendering further functions of the lighting fixture possible such as, for example, lateral visibility.

Such lighting fixtures are used, for example, for motor vehicle lighting, and in particular in lighting units such as tail lights, reversing lights, daylight driving lights, and the like.

Exterior motor vehicle lighting, for example indicator lights, is subject to international standards as regards the most important parameters thereof such as, for example, the SAE standards and the ECE regulations.

In view of the above applications of motor vehicle lighting, there is a demand for motor vehicle lighting fixtures that offer additional functions and relevant design options for lighting fixtures that are not rotationally symmetrical in appearance.

It is an object of the invention to provide a motor vehicle lighting fixture that is capable of performing additional functions without an additional light source and that furthermore offers a greater freedom of design, in particular as regards the design of the lighting fixture or its appearance during operation of the lighting fixture. The lighting fixture should furthermore be suitable for production in an industrial mass manufacturing process.

The object of the invention is achieved by means of the characterizing features of claim 1.

It is essential for the invention that a portion of the light from the light source issues from the light-transmitting part in a defined (directional) manner and is not incident on the reflector.

The word 'defined' within the scope of the invention relates to a directional issuing of light which effectively renders possible a defined coupling-in into an optical component, for example an optical waveguide or fiber.

Light is thus made available for the second function to be performed by the lighting fixture without an additional light source being necessary.

A portion of this light may also issue from the light-transmitting part, as does the portion aimed at the reflector. Alternatively, this portion of the light according to the invention may issue at a different angle to the optical axis, whereby a further modified embodiment for the light-transmitting part is made possible.

The possibilities of the use of a single LED light source per motor vehicle lighting fixture can thus be better exploited. This so-termed single-light source is more efficient than a motor vehicle lighting fixture comprising several LED light sources, and statistically it is more favorable for the user of the fixture because in the case of a defect of an LED light source the entire motor vehicle lighting fixture with several LED light sources has to be replaced, in particular for reasons of technical safety.

The dependent claims 3 to 7 relate to advantageous further embodiments without the invention being limited thereto.

It is preferred that a portion of the light issuing from the light source and passing through the light-transmitting part in a defined manner can be coupled into an optical waveguide system.

It is also preferred that the reflector consists of at least two parts whose centers do not lie on the optical axis (Ax). However, embodiments with only one reflector are also possible within the scope of the invention.

It is furthermore preferred for the invention that the light source is formed by a single LED.

Figure 2:
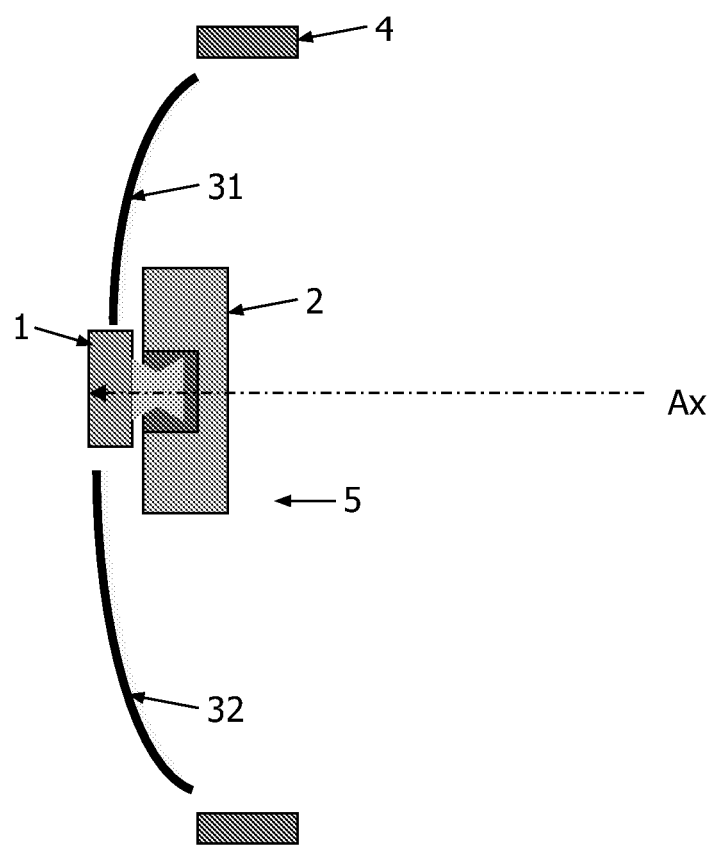

Further particulars, features, and advantages of the invention will become apparent form the ensuing description of two preferred embodiments, which is given with reference to the accompanying drawing, in which:

FIG. 1 diagrammatically shows a motor vehicle lighting fixture according to the invention that is not rotationally symmetrical, and FIG. 2 is a diagrammatic side elevation of a motor vehicle lighting fixture according to the invention.

FIG. 1 diagrammatically shows a motor vehicle lighting fixture according to the invention that is not rotationally symmetrical.

The motor vehicle lighting fixture 5 comprises in particular a light source 1 (not visible in FIG. 1), which is a single LED, and a light-transmitting part 2 which is arranged such that it receives light from the light source 1. The light-transmitting part 2 is dimensioned in a conventional manner such that it provides a sufficiently large portion of the light to a reflector 3 in a defined manner.

The reflector 3 is arranged such that it reflects a portion of the light coming from the light source 1 and couples it out in particular at the front of the motor vehicle lighting fixture 5, thus providing the required light distribution. The first one of the two functions of the motor vehicle lighting fixture 5 is achieved thereby.

The light-transmitting part 2 comprises a reflection portion and a refraction portion (not shown in FIG. 1), which are present at least on the surface of the light-transmitting part 2.

The reflection portion serves in particular to change the direction of the light that issues from the light source 1 by means of total reflection. This change in direction takes place substantially at right angles to the optical axis of the reflector 3, whereupon the refraction portion couples out the light in the direction of the reflector 3.

The reflector 3 comprises several parts, here a first reflector part 31 and a second reflector part 32, and is of an asymmetrical construction. A portion of the light is coupled into the reflector parts 31 and 32 in a usual manner via respective light emission surfaces 21 and 22 of the light-transmitting part 2. The light emission surfaces 21 and 22 are arranged substantially parallel to one another.

Another portion of the light is coupled out into an optical waveguide system 4 in a usual manner via two respective light emission surfaces 23 and 24 of the light-transmitting part 2. The light emission surfaces 23 and 24 are arranged substantially parallel to one another and substantially perpendicular to the light emission surfaces 21 and 22. The second one of the two functions of the motor vehicle lighting fixture 5 is sufficiently characterized thereby.

FIG. 2 is a diagrammatic side elevation of the motor vehicle lighting fixture according to the invention shown in FIG. 1. The optical axis Ax of the light source 1, indicated with a dash-dot line, does not pass through the two centers of the reflector parts 31 and 32.

The motor vehicle lighting fixture 5 in particular comprises a light source 1, which is a single LED light source, and a light-transmitting part 2. The parameters of the LED light source are as follows: it consists of one or several light-emitting chips. The generated light is given a certain direction by a primary optical system, for example laterally deflected or, for example, radiated by the Lambert principle. The LED can be operated at two levels of brightness so as to render possible the different lighting functions (tail light, stop light, indicator light, etc.).

The color of the light may be red, white, or amber (orange/yellow) in accordance with the ECE regulations and the SAE standard.

The invention claimed is:

1. A motor vehicle lighting fixture which comprises at least: a light source (1) comprising at least one LED; a light-transmitting part (2) that is arranged such that it receives light from the tight source (1); and a reflector (3) that is arranged such that it reflects that portion of the light from the light source (1) that passes through the light-transmitting part (2) and couples it out to the front of the lighting fixture (5), a reflection portion and a refraction portion being provided within the light-transmitting part (2), wherein said reflection portion deflects the light issuing from the light source (1) through total reflection in one direction that is substantially perpendicular to the optical axis of the reflector (3) and issues from the light-transmitting part (2) without hitting the reflector (3) and in the one direction that is substantially perpendicular to the optical axis of the reflector (3), whereas the refraction portion couples out the light in the direction of the optical axis of the reflector (3).

2. A motor vehicle lighting fixture as claimed in claim 1, characterized in that the light-transmitting part (2) has at least one light emission surface (23) from which the issuing light is incident on the reflector (3).

3. A motor vehicle lighting fixture as claimed in claim 1, characterized in that the light-transmitting part (2) has at least one light emission surface (23) from which the issuing light is not incident on the reflector (3).

4. A motor vehicle lighting fixture as claimed in claim 1, characterized in that at least a portion of the light that is not incident on the reflector (3) is coupled into an optical waveguide (5).

5. A motor vehicle lighting fixture as claimed in claim 1, characterized in that the reflector (3) consists of at least two parts (31; 32) whose centers do not lie on the optical axis (Ax).

6. A motor vehicle lighting fixture as claimed in claim 1, characterized in that the light source (1) is a single LED light source.

7. A motor vehicle lighting fixture as claimed in claim 1, characterized in that a portion of the light that passes from the light source (1) through the reflection portion provided within the light-transmitting part (2) and that is not incident on the reflector (3) can be directionally coupled substantially completely into an optical component.

* * * * *